United States Patent Office 3,743,527
Patented July 3, 1973

3,743,527
PARTICLE-SIZE MODIFIED PIGMENTS AND METHOD OF INCREASING PIGMENT DISPERSIBILITY
Orlando Leonard Bertorelli, Havre de Grace, Md., assignor to J. M. Huber Corporation, Locust, N.J.
No Drawing. Original application Nov. 17, 1969, Ser. No. 877,469. Divided and this application May 27, 1971, Ser. No. 147,665
Int. Cl. C09c 1/28
U.S. Cl. 106—309                    2 Claims

ABSTRACT OF THE DISCLOSURE

An oil or latex emulsion introduced into a system with a non-crystalline, insoluble synthetic pigment wet filter cake prevents or reduces the growth of ultimate pigment aggregate sizes when the water leaves a hydrogel type pigment by thermal action. Oil or latex may reduce the aggregate structure which is normally obtained by conventional thermal drying. The resulting pigmentary materials may be used in rubber and paint.

CROSS REFERENCE TO RELATED APPLICATION

This application is a divisional application of Ser. No. 877,469 filed Nov. 17, 1969, now abandoned.

BACKGROUND OF THE INVENTION

In general, the present invention is concerned with the proper dispersion of pigmentary materials in final products, such as reinforcing pigments in rubber and extender pigments in paint.

In general, the prior art in this area has suffered from the fact that pigmentary materials, produced by a hydrogel type process, tend to form fairly large agglomerates during the liquid removal cycle. A great deal of difficulty has been experienced in attempting to disperse these materials. This difficulty arises from the fact that the agglomerates or aggregates tend to bond so well that only very high shear can disperse them.

While the effects on rubber properties of a combination of filler-latex mixtures in an aqueous medium are generally known as shown by U.S. Pat. 3,271,356 and British Pats. 920,466 and 1,004,149 these combinations have not been widely and successfully used in the past because of problems related to agglomerates and aggregates.

It has been the prior art approach to spray latex and pigments from separate points into a spray dryer for later mechanical mixing in the dried form, e.g., U.S. Pat. 3,194,781.

The general approach of the present invention has been to attack the problems produced by the above mentioned agglomerates and aggregates by attempting to prevent their formation.

The prior art, of course, teaches that the combination of pigment and latex in an aqueous slurry have been formulated and dried in a variety of specified manners. However, the present invention differs from the earlier art in the selection of the reinforcing pigments; in the use of the co-dispersion technique; and in the use of spray drying and the manner in which it is used.

SUMMARY OF THE INVENTION

Accordingly, it is an object of the present invention to produce a new pigment, and a new latex/pigment compound and a highly effective method of producing the same which overcomes the deficiencies of the prior art as described above.

It is a further object of the present invention to provide a method which prevents or inhibits the formation of agglomerates and aggregates.

Another object of the present invention is to provide a modified synthetic silica or silicate with improved dispersibility in rubber and paint.

An additional object of the present invention is to provide a method of preventing, limiting or reducing the growth of pigment aggregate and/or agglomerate sizes when water leaves a hydrogel type pigment by thermal action.

It is a further object of the present invention to provide a highly dispersible, finely divided particulate pigment, such as sodium alumino silicate and hydrated silica.

Yet another object of the present invention is to provide an oil or latex treated, spray dried synthetic silica or silicate, such as Zeolex®, which provides improvements in rubber properties.

Another object is to provide a process of using dissimilar materials in the pigment wet filter cake to keep aggregation of the particles to a minimum during drying processes.

Other objects and a fuller and more complete understanding of the invention described herein will be apparent from the continuing specification and the following descriptions and claims, taken in conjunction with each other.

The present invention overcomes the deficiencies of the prior art and achieves its objectives by providing for the introduction of a dissimilar material into the pigment system prior to the removal of the liquid by drying. This material acts as a pigment particle separator, or parting agent, as the liquid is being removed. This material thereby prevents particle bonding by acting as a parting agent or spacing material which establishes itself between or around the smaller particles of the reinforcing pigment for rubber or the filler material for paint, for example, thus limiting the size of the agglomerate as well as the aggregate of the synthetic pigment.

DESCRIPTION OF THE PREFERRED EMBODIMENTS

To provide and facilitate a better understanding of the present invention, reference will now be made to certain preferred embodiments of the present invention. These embodiments are not to be construed as limiting the scope or breadth of the present invention, but are exemplary only.

As used herein the following descriptions of pigment particles may be helpful in understanding the nature of the present invention. "Crystallites" are small crystals. "Crystalline aggregates" are compact collections of crystals. "Agglomerates" are collections of aggregates which are cemented together by (sintering) non-compatible materials formed or used in the manufacturing process. Agglomerates, broken down, cannot reform. "Air flocculates" are easily separated and easily reformed aggregates. A pigment powder obviously contains aggregates, agglomerates and air flocculates up to hundreds of microns in size, even though the crystal size may be 0.1 micron or less.

The materials, described herein as being dissimilar, and used for and as examples of parting agents, are naphthenic rubber process oil and SBR latices (synthetic styrene-butadiene rubbers). It should be recognized that there is no intent to restrict the aforementioned dissimilar materials or parting agents to the above materials since a wide variety of materials having similar properties may be utilized. It should be understood further that the process or method of the present invention is generally applicable using many such parting agents, depending basically on the end use function of the pigment as well as the compatibility of the parting agent in the designated vehicle.

In general, any organic material which is not compatible with the pigment but which is compatible with rubber or with the desired ultimate end use may be employed as the parting agent to separate the ultimate particles in an aqueous slurry and to prevent their cementing together when the water is driven off during drying.

The terms, "non-crystalline, insoluble synthetic pigment," "pigmentary materials," or "hydrogel type pigment," and other such terms as used herein in referring to those pigments that may be advantageously modified in the practice of this invention include, for example, the following typically finely divided particulate synthetic pigments, such as sodium alumino silicates, calcium silicates, calcium-sodium alumino siicates, synthetic clays, synthetic zeolites, synthetic talcs (magnesium silicates), and the like.

Although the modified, non-crystalline, insoluble synthetic silicas and silicates chosen are described herein for use in rubber, it is reasonable to assume that one of ordinary skill in the art may conclude that the effects of their dispersion characteristics after modification according to the invention, will parallel themselves in other use areas, such as fillers in protective coatings, paper, paints, varnishes and the like.

As noted above the present invention concerns a method for producing non-dusting, finely divided, free-flowing pigments suitable for use in rubber compounding and the like. In addition, the present invention involves the spray drying of a wet filter cake pigmentary material in which has already been adequately dispersed a rubber latex and/or oil, among other similar types of materials.

The invention consists partly of a masterbatch produced by the spray dried process without the need of pre-coagulation. Ordinarily, for adequate coagulation strong acid salts and/or acids are utilized. The present invention eliminates the use of acids or acid salts for coagulation which later need to be washed from the crumbs before drying, and it eliminates the use of alum which contains iron, which has been found to oxidize and degrade SBR on aging. Further, there is no need for filtering or tunnel drying. Usually, the SBR is coagulated with acids or acid salts and then compressed into a bale. The present invention eliminates the coagulation step while permitting the pigment to be well dispersed in the rubber.

Pigmentary concentrations in the final rubber composition are important as are the rubber concentrations. The present invention partially involves adding rubber latices to a slurry of synthetic silica or silicate to give a final rubber concentration of the product of between 1 and 60% rubber.

Ultimately, regardless of whether rubber, oil or other solvent is used, the mechanism is generally the same, namely, that of keeping the ultimate particles from cementing together during the drying process.

To fully appreciate the present invention it is important to distinguish between the mechanisms of a slurry and a solution. The present invention derives its successfulness from the operative mechanism of drying from a slurry.

The present invention teaches the use of dissimilar materials, such as parting agents or pigment particles separators, in the pigmentary wet filter cake in order to effectively deter excessive particle aggregation or agglomeration of the pigment when it is dried.

The particulate pigmentary materials, treated with either oil or latex, were compounded into rubber compositions according to the recipes shown in Recipes 1 through 4 inclusive. Conventional mill mixing procedures were then used.

Standard test procedures for the rubber compositions, such as abrasion resistance, stress-strain, stiffness, hardness, and rheometer/viscosities, were followed, the results of which are reported in Tables I and II. Control pigments were prepared by first drying and then milling a portion of the same wet cake material used in the present invention.

Pigmentary materials, such as the particulate synthetic silicas and silicates, and more particularly the sodium alumino silicates of submicron particle size produced according to the disclosures of U.S. Patents 2,739,073 and 2,848,346 and silicic acid pigments produced according to U.S. Patent 3,110,606, and other similar materials, such as hydrated silicas, can be used to great advantage in the present invention.

The synthetic silicas and silicates, namely those commercially available and known as Zeolex®, a very finely divided precipitated sodium alumino silicate pigment of submicron particle size and disclosed in U.S. Pats. 2,739,073 and 2,848,346; Silene® EF, a precipitated hydrated calcium silicate of very fine particle size; Zeo® 45, a hydrated silica of very fine particle size; and other typical, finely divided, particulate silicas or silicates can, also, be advantageously used in the practice of the herein described invention.

The naphthenic oil used for the various oil treatments is produced by Sun Oil Company. It is marketed under the trade name, "Circosol NS." The data pertaining to this oil is tabulated in Table I. The latex used for the pigment treatments is produced by Goodyear Rubber Company. It is a 30% styrene/70% butadiene latex having a 40.8% solids content and is marketed under the trade name "Pliolite 2108."

Analysis of the oil extended materials for oil content consisted of an extraction method using the Soxhlet extraction apparatus and chemically pure benzene as the solvent. After all of the oil was presumed extracted, the benzene was removed by distillation at carefully controlled temperatures, and the residual oil was weighed and calculated as a percent by weight. Since the initial boiling point of the Circosol NS is 615° F. and the maximum temperature attained in the spray dryer was only 350° F., this method of determining the oil content in the modified pigments can be termed as being satisfactory.

In the pigment/latex combinations the latex was treated with ammonium hydroxide to increase its stability prior to its addition to the silica pigment slurry.

Further, when the anti-oxidant was used, it was added to the pigment/latex slurry. More particularly, the pigment/latex slurry compounded without anti-oxidant oxidized quite noticeably, and when compounded with Recipes 3 and 4, yielded products that could not be tested according to the standard rubber test procedures. The products were boardy, charred and non-elastic.

The modified dispersible pigment complex can be used in a variety of applications such as in rubber based protective coatings, rubber compounds, and oil based paint formulations.

Several methods of adding from 1 to 15% by weight of "Circosol NS" rubber process oil to the pigments were evaluated. They included (1) mixing the dried, milled synthetic silica or silicate with alcohol extended oil in a pin mixer until pellets formed; (2) mixing oil emulsified wet pigment filter cake with dry pigment in a pin mixer until pellets formed; and (3) drying oil emulsified wet pigment filter cake in a spray dryer, of which the third method is apparently the most practical and economical method.

The pigment/latex combinations were prepared to give equal rubber/silica pigment on a dry weight basis. The latex was mixed with the fine, particulate silica or silicate wet filter cakes and then dried in a spray dryer.

Abrasion resistance of a pigment/latex product was significantly increased over the control material. The oil treated pigments, produced by the emulsified wet filter cake/spray drying method showed similar marked improvements in such rubber properties as modulus, stiffness, hardness, and viscosity. Stiffness of the rubber stocks was improved 30–40%. Other properties listed in Table I show significant trends toward similar improvements. These rubber property improvements are related to the fineness of the pigment aggregate sizes.

Mechanical treatment of spray dried pigments with oil by tumbling the materials in a drum did not demonstrate comparable improvements in tested rubber properties of the pigment/oil mixture, particularly hydrated silica/oil, as shown in Table II. Oil treatment of this nature did not change the size or the configuration of the pigment aggregates. These results apparently demonstrate the importance of keeping aggregate sizes as small as possible since the pigment clustering or agglomerating structure once formed in the drying process, is very difficult to break down.

The fine particulate, synthetic silicas and silicates were treated with 10 and 15% by weight of oil, with each pigment having up to about 5% free moisture. At these concentrations the pigment, such as sodium alumino silicate, would contain an amount of oil about equal to that which is present in an oil-extended polymer typically used for rubber sole and heel compositions.

Three methods were employed during the study for combining the pigment and oil. They are as follows:

METHOD A

The pigment was pelletized in a pin mixer by adding an alcohol extended oil as the pelletizing liquid. The alcohol was subsequently removed by evaporation in an oven at 60° C. leaving the oil dispersed throughout the pellets.

METHOD B

The second method studied was the emulsification of the wet filter cake with oil containing an emulsifying agent, followed by the addition of dry powdered pigment to the emulsified mass while pin mixing until pellets were formed. Water in the pellets was removed by heating in an oven at 120° C.

METHOD C

After the oil was emulsified with the wet filter cake using an emulsifying agent at 0.3 part per hundred of oil, the mass was adjusted to a pumpable consistency and subsequently spray dried to recover the product. The spray dried product was thereupon hammermilled prior to its incorporation into the rubber compound.

Oil treated pigments, prepared in a pin mixer, were found unsatisfactory because of poor pellet stability; no significant increase in bulk densities; and no significant reduction in dustiness. However, the oil extension of the rubber elastomer was satisfactory by the method.

Method C was particularly useful and adjudged to be the most practical method of oil addition of the methods evaluated. It was particularly important that Method C allowed the oil to become thoroughly dispersed in the wet filter cake and that the resultant pigment closely resembled the original, fine particulate synthetic silica. It is consequently surmised that no major difficulty should be encountered in handling, packaging or transporting the resultant pigment from such an origin in any conventional manner.

To further facilitate the understanding of the present invention, pigment/latex combinations were made at equal rubber/pigment weight ratios. As a typical example in producing a pigment/latex combination, the latex was first stabilized by the addition of ammonium hydroxide. The stabilized latex was then added to the wet filter cake and subsequently spray dried at about 300° F. The spray dried, dispersed pigments were light and fluffy and were easily compressed into a rubber cake even by so slight a pressure as hand pressure. It likewise sheeted readily on a two-roll mill.

The following examples are illustrative of the invention only and are not intended to limit the scope of the present invention.

Example I

A hydrated silica, containing about 15% oil by weight, 5% free moisture, was prepared by mixing 160 grams of "Circosol NS," containing 0.305 gram of emulsifying agent, with 13 pounds of wet filter cake, containing 86% moisture. The mixture was emulsified using a high torque variable speed stirrer equipped with a turbine propeller. The emulsified slurry was then spray dried at a feed rate of 240 mls./min. The spray dryer inlet temperature was held at 815° F. and its outlet temperature at about 310–325° F. The product was a white, finely divided powder that greatly resembled a hammermilled product in degree of fineness.

Example II

The procedure of Example I was repeated, except the hydrated silica contained only about 10% oil by weight.

Example III

To a hydrated silica filter cake slurry was added 0.15% of an emulsifying agent and the mass was agitated for 5 minutes at high speeds. To this mixture was added 10% Circosol "NS" oil. The entire mixture was then agitated for 10 minutes. The percents are by weight based on the dry hydrated silica. The feed rate to the spray dryer was about 230 mls./min. with the inlet temperature at 810° F. and the outlet temperature at between 320–340° F. The product had a 5% slurry concentration pH of 7.28, 3.01% moisture and a surface area of 73.5 m.$^2$/g.

Example IV

The procedure for Example III was repeated, except the mixture contained 14.4% Circosol "NS" oil. Resulting product had a 5% slurry concentration pH of 7.25, 2.85% moisture, and a surface area of 63.7 m.$^2$/g.

Example V

A hydrated silica containing no oil was spray dried and used as a control. The feed rate to the spray dryer was about 250 mls./min. Its inlet temperature was about 810° F. and the outlet temperature was about 310–325° F. The product had a 5% slurry concentration pH of 7.25, 3.19% moisture, and a surface area of 117.5 m.$^2$/g.

Example VI

The procedure of Example I was repeated, except a sodium alumino silicate pigment was used.

Example VII

The procedure of Example VI was repeated, except the pigment contained only about 10% oil by weight.

Example VIII

Sodium alumino silicate, containing no oil, was dried in a spray dryer to be used as a control. The feed rate was 334 mls./min. Inlet temperature of the spray drying operation was 685° F., while the outlet temperature was 320–325° F. The final product moisture was 4.11% with a 20% slurry pH of 10.3 and surface area of 52.2 m.$^2$/g.

Example IX 1.5% or 3.045 grams of an emulsifying agent were added to 1800 grams of sodium alumino silicate filter cake slurry which was then heated to 132° F. and agitated for 5 minutes. 10% or 200 grams of oil were then added and the entire mass was agitated an additional 10 minutes. Feed rate of the mass to the spray dryer was 300 mls./min. Inlet temperature of the spray dryer was 690° F. and its outlet temperature was 310–320° F. Final product moisture was 2.52% with 20% slurry concentration pH of 9.4 and surface area of 30.1 m.$^2$/g.

Example X

1% or 3.21 grams of an emulsifying agent were added to 1800 grams of sodium alumino silicate filter cake slurry which was heated to 109° F. The materials were then agitated for 5 minutes. 318 grams of oil were then added to the slurry, and the entire mass agitated for 10 minutes. Feed rate into the spray dryer was set at 334 mls./min. with its inlet temperature at 650° F. and its outlet temperature at 320–325° F. Air pressure to the spray dryer atomizer was maintained at 60–70 p.s.i.g. Final product moisture was 1.92% with a 20% slurry concentration pH of 9.3 and surface of 27.1 m.²/g.

Example XI

A hydrated silica/SBR mixture containing about 50% hydrated silica and 50 SBR (styrene-butadiene rubber), was prepared by first mixing 5460 grams of hydrated silica filter cake (14.7% solids containing 800 grams of hydrated silica) and 2 liters of water with 1500 grams of SBR latex (40% solids) which had been stabilized with 100 mls. of concentrated ammonium hydroxide. The two portions were thoroughly mixed and then spray dried at a rate of 100 mls./min. The spray dryer inlet temperature was maintained at 600° F. and its outlet temperature at 100° F.

Example XII

The procedure of Example XI was repeated, except a sodium alumino silicate pigment was used.

Example XIII

To 1600 grams of styrene-butadiene rubber latex at 40% solids concentration was added 25 milliliters of ammonium hydroxide for pH adjustment. To this mixture was added 12.8 grams of anti-oxidant. This mixture was subsequently added to 3260 grams of sodium alumino silicate and mixed thoroughly, then dried in an oven. This pigment/latex combination was used as a control.

Example XIV

The procedure of Example XIII was repeated, except 5500 grams of a hydrated silica was used at 15.4% solids concentration. This pigment/latex combination was used as a control.

Example XV

To 1600 grams of styrene-butadiene rubber latex at 40% solids concentration was added 25 milliliters of ammonium hydroxide for pH adjustment. To this mixture was added 12.8 grams of antioxidant. This mixture was subsequently added to 3260 grams of sodium alumino silicate wet cake slurry, mixed thoroughly and dried in a spray dryer at outlet temperatures of between 120° to 130° F.

Example XVI

To 1600 grams of styrene-butadiene rubber latex at 40% solids concentration was added 25 milliliters of ammonium hydroxide for pH adjustment. To this mixture was added 12.8 grams of antioxidant. This mixture was subsequently added to 5500 grams of a hydrated silica wet cake slurry, mixed thoroughly and dried in a spray dryer at outlet temperatures of between 120° to 130° F.

The oil treated pigments were compounded into rubber using Recipes 1 and 2. Conventional rubber testing procedures were used in the rubber property evaluations.

Oil treatment of the pigment slurries by emulsification and recovered by the spray drying method significantly increased the stiffness, hardness and viscosity of the cured rubber composition. The increase in stiffness was an improvement of about 30 to 40%. The hardness and viscosity properties showed an improvement trend in the same direction as illustrated in Table I. Mechanical mixtures, which contained dried pigment, did not show comparable rubber property improvements as shown in Table II. This data indicates that the more difficult to disperse pigment aggregates were formed during the pigment drying operation. The oil addition in compounding consequently did nothing to break down the aggregates.

TABLE I.—RUBBER PROPERTIES OF SPRAY DRIED, OIL TREATED WET FILTER CAKES

| Example | Percent oil by weight | Percent of control | | | Shore A hardness, pts. difference from control |
|---|---|---|---|---|---|
| | | 300% modulus | Olsen stiffness | Mooney viscosity | |
| 8 (control) | 0 | 100 | 100 | ND | 0 |
| 9 | 10 | 109 | 116 | ND | +2 |
| 10 | 15 | 110 | 120 | ND | +3 |
| 5 (control) | 0 | 100 | 100 | 100 | 0 |
| 3 | 10 | 108 | 120 | 110 | +2 |
| 4 | 15 | 118 | 141 | 122 | +3 |

TABLE II.—RUBBER PROPERTIES OF OIL TREATED SPRAY DRIED HYDRATED SILICA

| Sample | Percent oil by weight | Percent of control | | | Shore A hardness, pts. difference from control |
|---|---|---|---|---|---|
| | | 300% modulus | Olsen stiffness | Mooney viscosity | |
| Control | 0 | 100 | 100 | 100 | 0 |
| 1 | 10 | 102 | 103 | 107 | 0 |

From Table I, it is apparent that the spray dried, oil-treated product of this invention significantly improves the fundamental rubber properties of an SBR compound. The recipes connected with Table I consisted of the following:

RECIPE 1.—RUBBER RECIPE FOR USE WITH OIL TREATED HYDRATED SILICA

| Ingredients: | Parts/100 rubber |
|---|---|
| SBR 1778 | 90.00 |
| SBR 1510 | 35.00 |
| Pliolite S6B | 47.00 |
| Zinc oxide | 6.65 |
| Sodium alumino silicate | 7.00 |
| Hydrated silica | 70.00 |
| Ti-Pure 101 | 2.25 |
| Red oxide | 0.80 |
| Yellow oxide | 1.50 |
| Essex® SRF | 0.10 |
| Stearic acid | 1.00 |
| Carbowax 600 | 4.00 |
| Retarder PD | 0.65 |
| NOBS special | 1.00 |
| Captax | 0.80 |
| DOTG | 0.80 |
| Octamine | 1.00 |
| Circosol "NS" | 15.00 |
| Sulfur | 2.80 |
| | 287.35 |

RECIPE 2.—RUBBER RECIPE USED WITH OIL TREATED SODIUM ALUMINO SILICATE

| Ingredients: | Parts/100 rubber |
|---|---|
| SBR 1502 | 100.0 |
| Pliolite S6B | 20.0 |
| Zinc oxide | 3.0 |
| Stearic acid | 2.0 |
| Cumar MH 2½ | 7.5 |
| Sulfur | 2.5 |
| Santicure | 2.0 |
| DOTG | 1.0 |
| Sodium alumino silicate | 70.0 |
| | 208.0 |

To continue further, the test data in Table III illustrates that the pigment/latex complexes exhibit the same improvement in rubber properties as the pigment/oil combinations.

TABLE III.—RUBBER PROPERTIES OF SPRAY DRIED PIGMENT/LATEX MIXTURES

| Example | Rheometer scorch | Olsen stiffness | Shore A hardness | 300% modulus | Tensile strength | NBS abr. |
|---|---|---|---|---|---|---|
| 5 (control) | 100 | 100 | 0 | 100 | 100 | 100 |
| 16 | 40 | 113 | −1 | 98 | 100 | 135 |
| 8 (control) | 100 | 100 | 0 | 100 | 100 | 100 |
| 15 | 67 | 109 | 0 | 100 | 101 | 127 |

All the data illustrated in Table III was based on the control equaling 100% except with the Shore A Hardness which equals points difference from the control. The recipes connected with Table III are 3 and 4.

RECIPE 3.—RUBBER RECIPE USED FOR HYDRATED SILICA/LATEX PIGMENT

| Ingredients | Parts Recipe | Parts Control |
|---|---|---|
| Hydrated silica (no treatment) | | 154.0 |
| Masterbatch, 50—50 hydrated silica/latex | 308.0 | |
| SBR 1500 | 167.5 | 321.5 |
| Stearic acid | 6.0 | 6.0 |
| Zinc oxide | 9.0 | 9.0 |
| Cumar MH 2½ | 30.0 | 30.0 |
| MBTS | 6.0 | 6.0 |
| DPG | 3.0 | 3.0 |
| Carbowax 6000 | 9.0 | 9.0 |
| Sulfur | 9.0 | 9.0 |
| Total | 547.5 | 547.5 |

The term "Masterbatch" is a general rubber industry term used to designate rubber/pigment or rubber, oil/pigment combinations.

RECIPE 4.—RUBBER RECIPE USED FOR SODIUM ALUMINO SILICATE/LATEX MASTERBATCH

| Ingredients | Parts Recipe | Parts Control |
|---|---|---|
| Sodium alumino silicate (no treatment) | | 176.5 |
| Masterbatch, 50—50 sodium alumino silicate/latex | 353.0 | |
| SBR 1500 | 146.5 | 323.0 |
| Zinc oxide | 6.0 | 6.0 |
| Cumar MH 2½ | 9.0 | 9.0 |
| Santocure | 6.0 | 6.0 |
| DOTG | 3.0 | 3.0 |
| Sulfur | 7.5 | 7.5 |
| Total | 531.0 | 531.0 |

Specific temperatures, quantities of oil or latex, quantities of pigment and other important features of the present invention have been given throughout the heretofore presented specifications. That is not to say, however, that practical limits of those figures should not be considered. A practical limit on the the inlet temperature of the spray dryer when a pigment/oil complex is to be spray dried is considered to be 650–815° F. and the outlet temperature is 310–340° F. A practical limit on the inlet temperature of the spray dryer when a pigment/latex complex is to be spray dried is 600° F. or less and the outlet temperature is 100–130° F.

While the synthetic silicas and silicates and hydrated silicas have been predominately referred to in the preceding embodiments as the preferred embodiment of the invention, any of the other suitable inorganic pigments, such as those set forth earlier in the description of the present invention, may be modified in a like manner and employed to like effect as illustrated in this case.

While the present invention has been described herein with reference to its preferred embodiments, it will be understood by those skilled in the art that various changes in procedure may be made and equivalents may be substituted for the elements thereof without departing from the true spirit and scope of the present invention. Furthermore, many modifications may be made to adapt a particular situation or material to the teaching of the invention without departing from its essential teachings. Therefore, although specific preferred embodiments of the present invention have been described in detail above, the description is not intended to limit the invention to the particular forms or embodiments disclosed herein, since they are to be recognized as illustrative rather than restrictive, and it will be obvious to those skilled in the art that the present invention is not so limited. The invention is declared to cover all changes and modifications of the specific examples of the invention herein disclosed for purposes of illustration, which do not constitute departures from the spirit and scope of the invention.

What is claimed is:

1. A process for limiting the growth of ultimate pigment aggregation of a finely divided particulate, insoluble synthetic, amorphous inorganic pigment selected from the group consisting of sodium alumino silicate, hydrated silica, silicic acid, calcium silicate, calcium-sodium alumino silicate, synthetic clays, synthetic zeolites, and synthetic talcs comprising:
   (a) providing an aqueous suspension of said inorganic pigment,
   (b) introducing a naphthenic oil as an organic parting agent which is incompatible with said pigment but compatible with the ultimate pigment use into said aqueous inorganic pigment system with the parting agent constituting 1–60%, by weight, of the dry pigment, and
   (c) subsequently, spray drying the entire mass to remove the water from the system.

2. The process of claim 1 wherein said spray drying is conducted at an inlet temperature between approximately 650 and 815° F. and at an outlet temperature between approximately 120 and 340° F.

References Cited

UNITED STATES PATENTS

| 2,050,193 | 8/1936 | Park | 106—308 M |
| 3,591,519 | 7/1971 | Boylan | 106—308 Q |
| 1,843,576 | 2/1932 | McClure et al. | 106—288 B |
| 3,372,043 | 5/1968 | Farselow | 106—309 |

DELBERT E. GANTZ, Primary Examiner

J. V. HOWARD, Assistant Examiner

U.S. Cl. X.R.

106—288 Q